US010664412B2

(12) United States Patent
Jibbe et al.

(10) Patent No.: US 10,664,412 B2
(45) Date of Patent: May 26, 2020

(54) PERFORMANCE BOOSTER WITH RESOLUTION OF PICKET-FENCE I/O FLUSHING IN A STORAGE SYSTEM WITH HETEROGENEOUS I/O WORKLOADS

(71) Applicant: NETAPP, INC., Sunnyvale, CA (US)

(72) Inventors: Mahmoud K. Jibbe, Wichita, KS (US); Dean Lang, Wichita, KS (US); Scott Terrill, Wichita, KS (US); Matthew Buller, Wichita, KS (US); Jeffery Fowler, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 6 days.

(21) Appl. No.: 15/796,413

(22) Filed: Oct. 27, 2017

(65) Prior Publication Data

US 2019/0129863 A1 May 2, 2019

(51) Int. Cl.
*G06F 12/12* (2016.01)
*G06F 12/128* (2016.01)
*G06F 12/0871* (2016.01)

(52) U.S. Cl.
CPC ........ *G06F 12/128* (2013.01); *G06F 12/0871* (2013.01); *G06F 2212/604* (2013.01); *G06F 2212/621* (2013.01)

(58) Field of Classification Search
CPC ............... G06F 12/0871; G06F 12/128; G06F 2212/621; G06F 2212/604
USPC ........................................................ 711/135
See application file for complete search history.

(56) References Cited

U.S. PATENT DOCUMENTS

| 9,720,596 | B1* | 8/2017 | Bono | ..................... G06F 3/0608 |
| 2015/0301934 | A1* | 10/2015 | Baderdinni | ........... G06F 3/0631 |
| | | | | 711/103 |
| 2015/0347298 | A1* | 12/2015 | Hagersten | ........... G06F 12/0862 |
| | | | | 711/119 |

* cited by examiner

*Primary Examiner* — Hua J Song
(74) *Attorney, Agent, or Firm* — Haynes and Boone, LLP

(57) ABSTRACT

Systems and methods that select a cache flushing algorithm are provided. A stripe that spans multiple storage devices and includes a plurality of segments is provided. The stripe also includes dirty data stored in a picket-fence pattern in at least a subset of segments in the plurality of segments. A memory cache that stores data separately from the plurality of storage devices and a metadata cache that stores metadata associated with the dirty data are also provided. A cache flushing algorithm is selected using the metadata. The selected cache flushing algorithm flushes data from the memory cache to the stripe.

20 Claims, 10 Drawing Sheets

PERFORMANCE BOOSTER WITH RESOLUTION OF PICKET-FENCE I/O FLUSHING IN A STORAGE SYSTEM WITH HETEROGENEOUS I/O WORKLOADS

BACKGROUND

A storage system routinely flushes data from cache memory to stripes that span underlying storage devices. To efficiently flush data, the storage system uses various algorithms. Each algorithm efficiently flushes data under different scenarios. For a scenario where data is stored in few segments of a stripe, the read-write-modify algorithm is efficient and inexpensive. However, in a scenario where data is stored in multiple segments throughout a stripe, the read-write-modify algorithm may cause numerous I/O operations. These numerous I/O operations may cause latency in I/O processing and degradation in the storage system's performance. Thus, when data is stored in multiple segments of a stripe, a full flush algorithm may be more effective.

As such, there is a need to identify an efficient algorithm that flushes cache data to a stripe.

BRIEF DESCRIPTION OF THE DRAWINGS

The disclosure is best understood from the following detailed description when read with the accompanying figures.

FIGS. 2C-E are block diagrams of a stipe in a storage array that stores dirty data in a pseudo picket-fence pattern, according to an embodiment.

DETAILED DESCRIPTION

Figure 1:
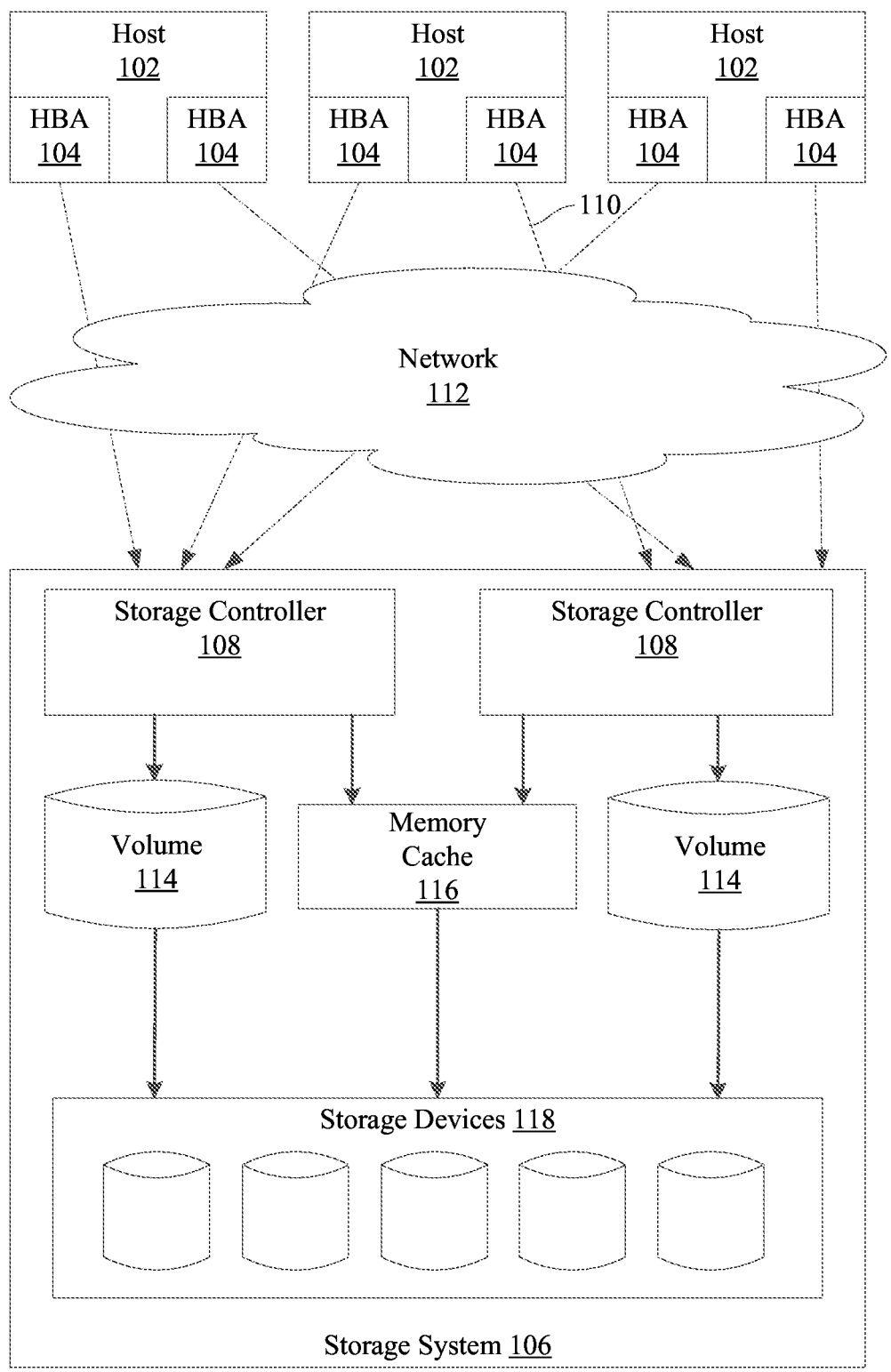
FIG. 1 is a block diagram of storage architecture where embodiments can be implemented.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

An example storage controller may select among various cache flushing algorithms to flush data from a memory cache to a storage array comprising underlying storage devices. Example algorithms are read-modify-write ("RMW") algorithm and a full stripe write ("FSW") algorithm.

Continuing with the example, to flush data from the memory cache, the RMW algorithm traverses the stripe in the storage array until the RMW algorithm encounters a dirty data block in the stripe. To modify the dirty data in the dirty data block with data from the memory cache, the RMW algorithm reads the dirty data and the corresponding parity from the stripe, modifies the dirty data with data stored in the memory cache, calculates the new parity using the modified data and then writes the modified data and the new parity back into the stripe. The RMW algorithm repeats the read, modify, and write operations for each dirty data block within the stripe. When the stripe includes few dirty data blocks, the RMW algorithm may be efficient and involves few read, write, and modify operations. However, when the stripe includes dirty data that is spread throughout the stripe in a picket-fence pattern, the RMW algorithm may generate a large number of read, modify and write operations. A large number of read, modify and write operations, in turn, result in system latency and adverse performance.

Unlike the RMW algorithm, the example FSW algorithm flushes data from the memory cache by replacing data in an entire stripe. To replace data in the entire stripe, the FSW algorithm reads data in the entire stripe, modifies the data in the stripe with the data in the memory cache, generates parity for the stripe with the modified data, and writes the modified data and the parity back into the stripe. Because the FSW algorithm replaces data in the stripe, the FSW algorithm has approximately fixed cost and uses approximately the same number of I/O operations. Although the FSW algorithm is less efficient than the RMW algorithm when there are few dirty data blocks within the stripe, when multiple segments of the stripe include dirty data, the FSW algorithm may be more efficient. This is because the FSW algorithm replaces data in the entire stripe and as a result uses fewer I/O operations to flush data from the memory cache.

To facilitate algorithm selection, the storage controller may utilize a metadata cache. The metadata cache stores metadata associated with I/O operations that retrieve data from the stripe. Example metadata includes the number of I/O operations, the range of the I/O operation, whether dirty data in the stripe resulting from the I/O operations is contiguous or non-contiguous, a number of dirty data blocks in a stripe that resulted from the I/O operations, etc. Based on the metadata in the metadata cache, the storage controller may identify scenarios where the dirty data is stored in a picket-fence pattern. When a picket-fence pattern exists, the storage controller may determine whether to use the RMW algorithm or FSW algorithm to flush data from the memory cache.

In an embodiment, the storage controller may use a virtual management algorithm, also referred to VDM algorithm to determine whether to use the RMW algorithm or FSW algorithm to flush data from the memory cache. In an embodiment, the VDM algorithm may use metadata to determine if the dirty data in the stripe is contiguous. If the dirty data is contiguous, the VDM algorithm determines whether a full segment write of dirty data into a segment of the stripe had occurred. If the full segment write occurred, the VDM algorithm determines the cost of the RMW algorithm as the cost of a first RMW pass through the stripe without a parity hit and the cost of subsequent RMW passes through the stipe with a parity hit. If the full segment write has not occurred, the VDM algorithm determines the cost of the RMW algorithm as though there would not be a parity hit on any read-modify-writes.

Continuing with the example, if the VDM algorithm determines that the dirty data is not contiguous, the VDM algorithm assumes the worst case scenario for using the RMW algorithm to flush data from memory cache. In this case, the VDM algorithm determines the total number of storage devices that span the stripe and the cost of updating a dirty data block and the corresponding parity in each segment of each storage device to determine the cost of flushing data with the RMW algorithm.

In an embodiment, the VDM algorithm also determines cost of the FSW algorithm. The VDM algorithm then selects the RMW algorithm or the FSW algorithm based on the determined costs.

In an embodiment, the example storage controller may use a cache selection algorithm, also referred to as a CS algorithm to determine whether to use the RMW algorithm or FSW algorithm to flush data from the memory cache. The CS algorithm uses metadata to determine whether the dirty data is contiguous or non-contiguous, and also the average I/O size that generates the dirty data. If the dirty data is non-contiguous and the average I/O size is below an I/O size threshold, CS algorithm traverses the stripe and identifies a number of contiguous sections of clean data. If the contiguous sections of clean data reach a contiguous section threshold, the CS algorithm selects the FSW algorithm to flush data from the memory cache. Otherwise, the CS algorithm selects the RMW algorithm to flush data from the memory cache.

FIG. 1 is a schematic diagram of exemplary storage architecture 100 where embodiments can be implemented. The storage architecture 100 includes a number of hosts 102 in communication with a number of storage systems 106. It is understood that for clarity and ease of explanation, only a single storage system 106 is illustrated, although any number of hosts 102 may be in communication with any number of storage systems 106. Furthermore, while the storage system 106 and each of the hosts 102 are referred to as singular entities, storage system 106 or host 102 may include any number of computing devices and may range from a single computing system to a system cluster of any size. Accordingly, each host 102 and storage system 106 includes at least one computing system, which in turn includes a processor such as a microcontroller or a central processing unit ("CPU") operable to perform various computing instructions. The computing system may also include a memory device such as random access memory ("RAM"), a non-transitory computer-readable storage medium such as a magnetic hard storage device ("HDD"), a solid-state drive ("SSD"), or an optical memory (e.g., CD-ROM, DVD, BD); a video controller such as a graphics processing unit ("GPU"); a communication interface such as an Ethernet interface, a Wi-Fi (IEEE 802.11 or other suitable standard) interface, or any other suitable wired or wireless communication interface; and/or a user input/output ("I/O") interface coupled to one or more user I/O devices such as a keyboard, mouse, pointing device, or touchscreen.

With respect to hosts 102, each host 102 includes any computing resource that is operable to exchange data with storage system 106 by initiating data transactions to the storage system 106. In an embodiment, host 102 includes one or more host bus adapters (HBAs) 104 in communication with storage controllers 108 of storage system 106. HBA 104 provides an interface for communicating with one or more storage controllers 108, and in that regard, may conform to any suitable hardware and/or software protocol.

In various embodiments, HBAs 104 include Serial Attached SCSI ("SAS"), iSCSI, InfiniBand, Fibre Channel, and/or Fibre Channel over Ethernet ("FCoE") bus adapters. Other suitable protocols include SATA, eSATA, PATA, USB, and FireWire. In the illustrated embodiment, HBA 104 is connected to a single storage controller 108, although in other embodiments, HBA 104 is coupled to more than one storage controller 108. Communications paths between the HBAs 104 and the storage controllers 108 are referred to as paths or links 110. A link 110 may take the form of a direct connection (e.g., a single wire or other point-to-point connection), a networked connection, or any combination thereof. Thus, in some embodiments, one or more links 110 traverse a network 112, which may include any number of wired and/or wireless networks such as a Local Area Network ("LAN"), an Ethernet subnet, a PCI or PCIe subnet, a switched PCIe subnet, a Wide Area Network ("WAN"), a Metropolitan Area Network ("MAN"), the Internet, or the like. In many embodiments, one or more hosts 102 have multiple links 110 with one of storage controllers 108 for redundancy. The multiple links 110 may be provided by a single HBA 104 or multiple HBAs 104. In some embodiments, links 110 operate in parallel to increase bandwidth.

To interact with (e.g., read, write, modify, etc.) data in storage system 106, host 102 sends one or more I/O requests to the respective storage system 106 via link 110. I/O requests may include data and instructions that causes storage system to read, write, and/or modify data stored within one or more data storage device such as disk drives within storage system 106, and may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

Turning now to storage system 106, exemplary storage system 106 includes storage controllers 108, volumes 114, at least one memory cache 116, and storage devices 118. In an embodiment, storage system 106 responds to I/O requests from hosts 102 in a way that storage devices 118 appear to be directly connected (local) to hosts 102. Storage system 106 may group storage devices 118 for speed and/or redundancy using a virtualization technique such as RAID (Redundant Array of Independent/Inexpensive Disks). At a high level, virtualization includes mapping physical addresses of the storage devices into a virtual address space and presenting the virtual address space to hosts 102. In this way, storage system 106 represents one or more storage devices 118 as a single device, often referred to as a volume 114. Thus, host 102 can access volumes 114 without concern for how it is distributed among the underlying storage devices 118.

In an embodiment, storage devices 118 include HDDs, SSDs, optical drives, and/or any other suitable volatile or non-volatile data storage medium. Further, storage devices 118 are arranged hierarchically and include a large pool of relatively slow storage devices.

Because storage devices 118 are relatively slow storage devices, storage system 106 initially stores data from the I/O requests issued by hosts 102 in memory cache 116. Memory cache 116 may be a smaller memory pool that typically utilizes faster storage media, such as one or more SSDs. In some embodiments, memory cache 116 may also include random-access memory configured as a RAM disk.

As discussed above, storage system 106 includes one or more storage controllers 108 in communication with storage devices 118 and at least one memory cache 116. Storage controllers 108 exercise low-level control over the storage devices 118 in order to execute I/O requests issued by hosts 102.

In an embodiment, storage controller 108 may initially store data from the I/O requests in memory cache 116. After a predefined or configurable time interval, storage controller 108 may transfers data in memory cache 116 to underlying storage devices 118. The operation that transfers data in memory cache 116 to storage devices 118 is referred to as flushing, cache flushing, or I/O flushing, in some embodiments.

As discussed above, storage system 106 includes storage devices 118. Another term for storage devices 118 may be a storage array. Storage devices 118 may be partitioned into multiple dynamic disk pool ("DDP") stripes or simply stripes. Each stripe may span across some or all storage devices 118. A stripe may also be defined as a smallest memory unit that remains consistent in a storage system implementing RAID. As such, a stripe may be a smallest memory unit that stores data and parity for the memory unit.

Figure 2A:
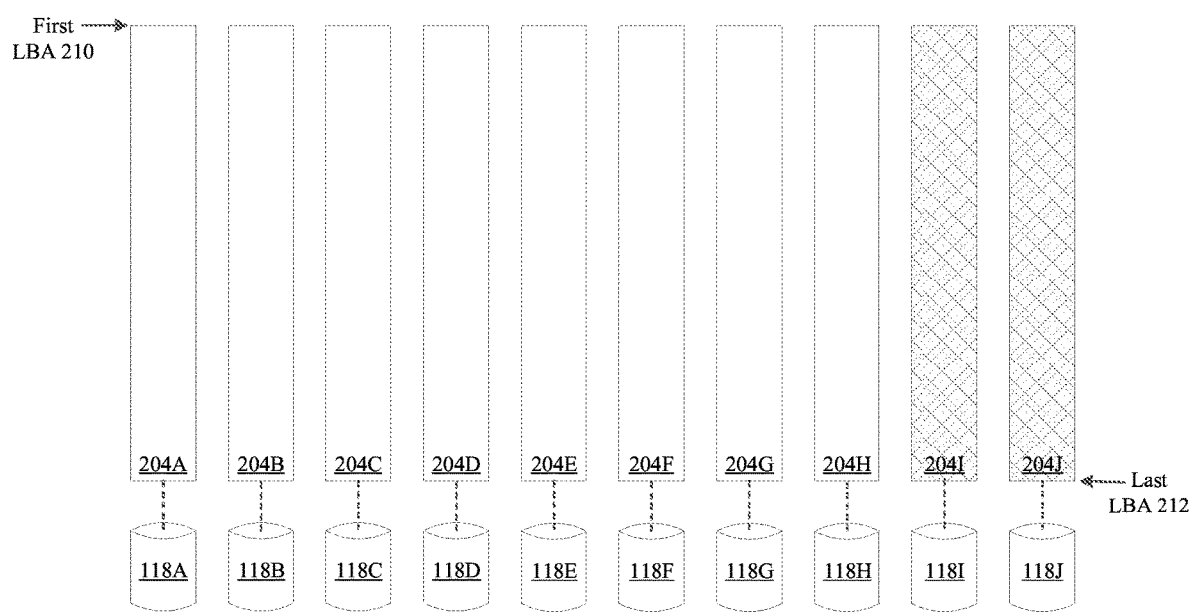
FIG. 2A is a block diagram of a stipe in a storage array, according to an embodiment.

FIG. 2A is a block diagram 200A of a stipe in a storage array, according to an embodiment. FIG. 2A illustrates an exemplary stripe 202 that is spread across storage devices 118A-J. In an embodiment, stripe 202 may be partitioned into one or more segments 204, such as segments 204A-J. Each one of segments 204A-J may span a portion of stripe 202 that is associated with one of storage devices 118A-J. As illustrated in FIG. 2A, storage device 118A includes segment 204A, storage device 118B includes segment 204B, storage device 118C includes segment 204C etc.

In an embodiment, segments 204I-J store parity for stripe 202. Parity ensures that data stored in segments 204A-H has not been corrupted during data transmission or other operations within storage system 106. Further, if one of storage devices 118A-H fails, storage controller 108 may use parity data in segments 204I-H and data in the remaining segments 204A-H to reconstruct the corrupted or unavailable data in the failed storage device. For example, if storage device 118A fails and data in segment 204A becomes unavailable, storage controller 108 may perform an XOR operation on parity data stored in one or both segments 204I-J and segments 204B-H of stripe 202 to reconstruct data in segment 204A.

In an embodiment, storage system 106 may access stripe 202 using a logical block address, also referred to as an LBA or a range of LBAs. For example, a range of LBAs starting from the first LBA 210 to last LBA 212 identifies a location of stripe 202 in storage devices 118. In a further embodiment, each segment 204A-H of stripe 202 may also be associated with an LBA range that spans the location of each segment 204A-H in the corresponding storage device 118A-H (not shown).

In an embodiment, stripe 202 may store dirty data. Dirty data is data that has been modified or deleted in storage system 106, such that storage devices 118 store an outdated or an unused data. In an embodiment, dirty data may be replaced by more current or new data stored in memory cache 116. In an embodiment, dirty data may be stored in one or more stripes 202 and in one or more segments 204 within each stripe 202.

Further, dirty data in stripe 202 may be stored in some or all segments 204 and in various patterns. FIGS. 2B-E are block diagrams 200B-E of stripe 202 that stores dirty data in picket-fence and pseudo picket-fence patterns, according to some embodiments.

Figure 2B:
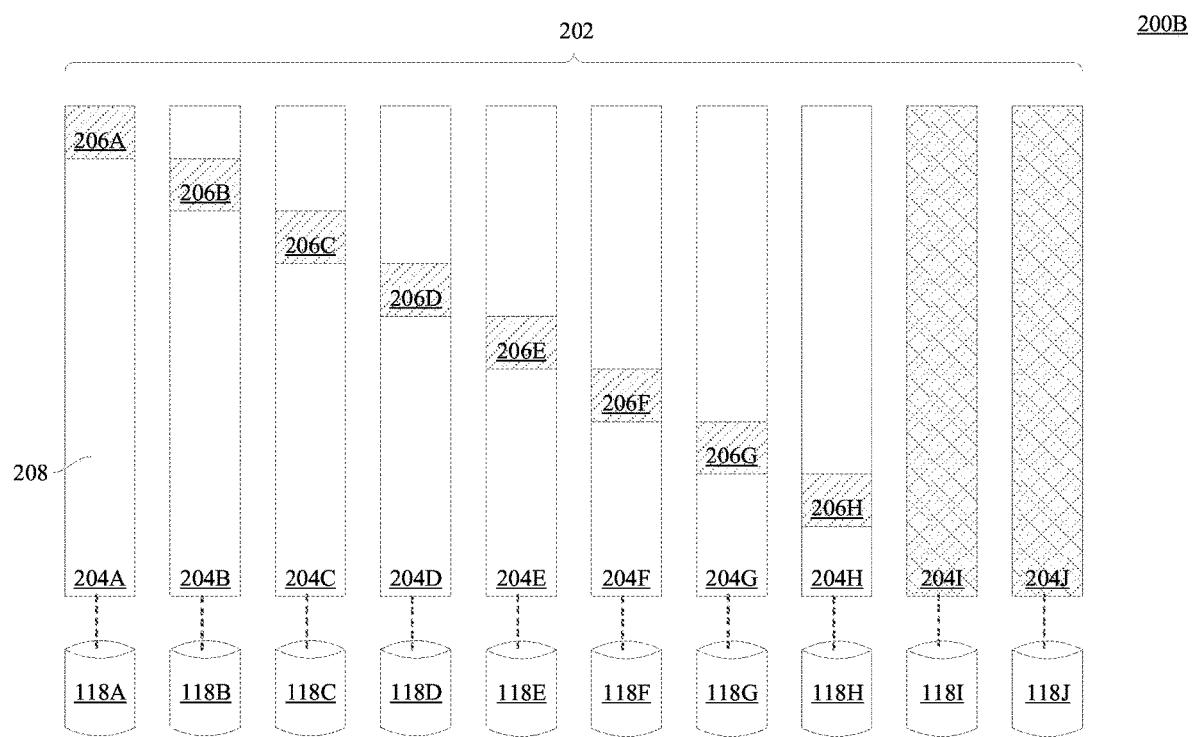
FIGS. 2B-C are block diagrams of a stipe in a storage array that stores dirty data in a picket-fence pattern, according to an embodiment.

FIG. 2B is a block diagram 200B of a stipe that stores dirty data in a picket-fence pattern, according to an embodiment. As illustrated in FIG. 2B, segments 204A-H includes dirty data blocks 206A-H. Dirty data blocks 206A-H store dirty data. Further, segments 204A-H in FIG. 2B store dirty data in a picket-fence pattern. A picket-fence pattern is a pattern where there is dirty data block 206 that includes dirty data that has been written to stripe 202, followed up a section of contiguous clean data 208, followed by another dirty data block 206, followed by another section of clean data 208, etc. FIG. 2B illustrates the picket-fence pattern where each segment 204A-H includes one of dirty data blocks 206A-H. Further, in the illustrated picket-fence pattern the dirty data blocks 206A-H are arranged in a "stair case" pattern.

Figure 2C:
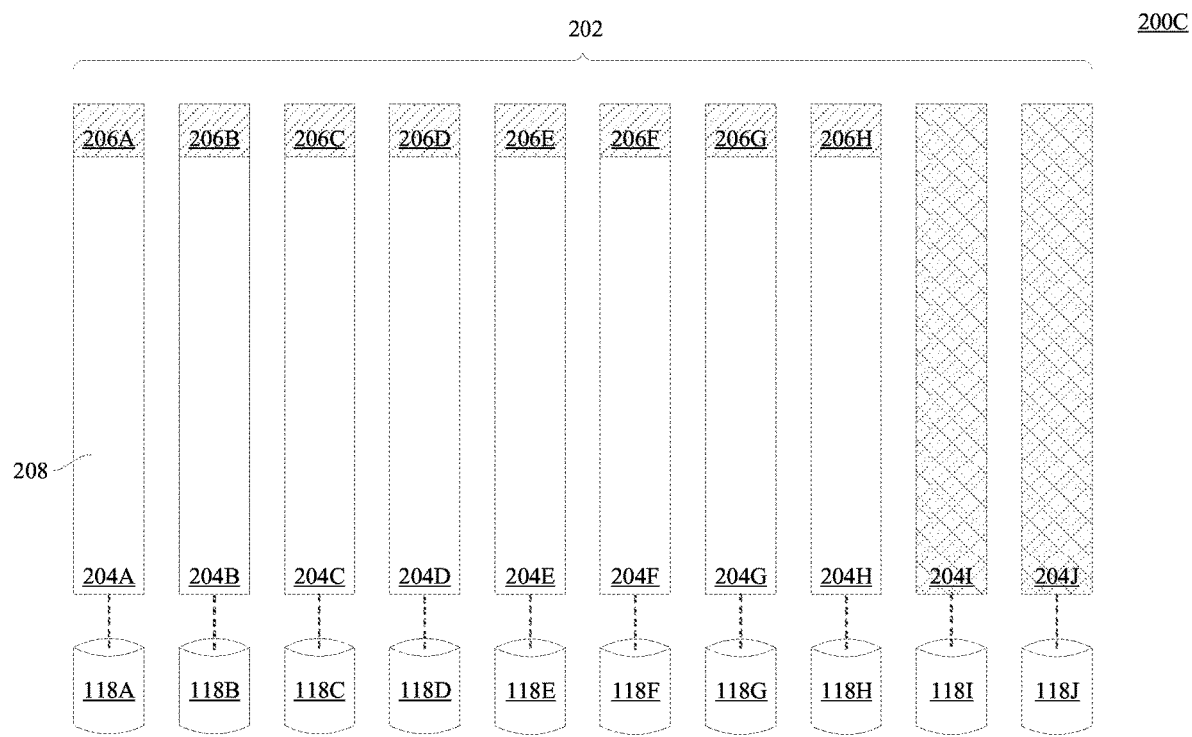

FIG. 2C is another block diagram 200C of a stripe that stores dirty data in a picket-fence pattern, according to an embodiment. Unlike FIG. 2B, the dirty data blocks A-H in FIG. 2C are stored in approximately the same memory location in each segment 204A-H. In an embodiment, the dirty data blocks 206A-H in FIG. 2C are arranged in an "aligned" pattern.

A person of ordinary skill in the arts will appreciate that example picket-fence patterns in FIGS. 2B and 2C are exemplary and that there may be other types of picket-fence patterns that are not illustrated in FIGS. 2A and 2B. Further, not all picket-fence patterns may have dirty data blocks 206 within each segment 204 of stripe 202.

Figure 2D:
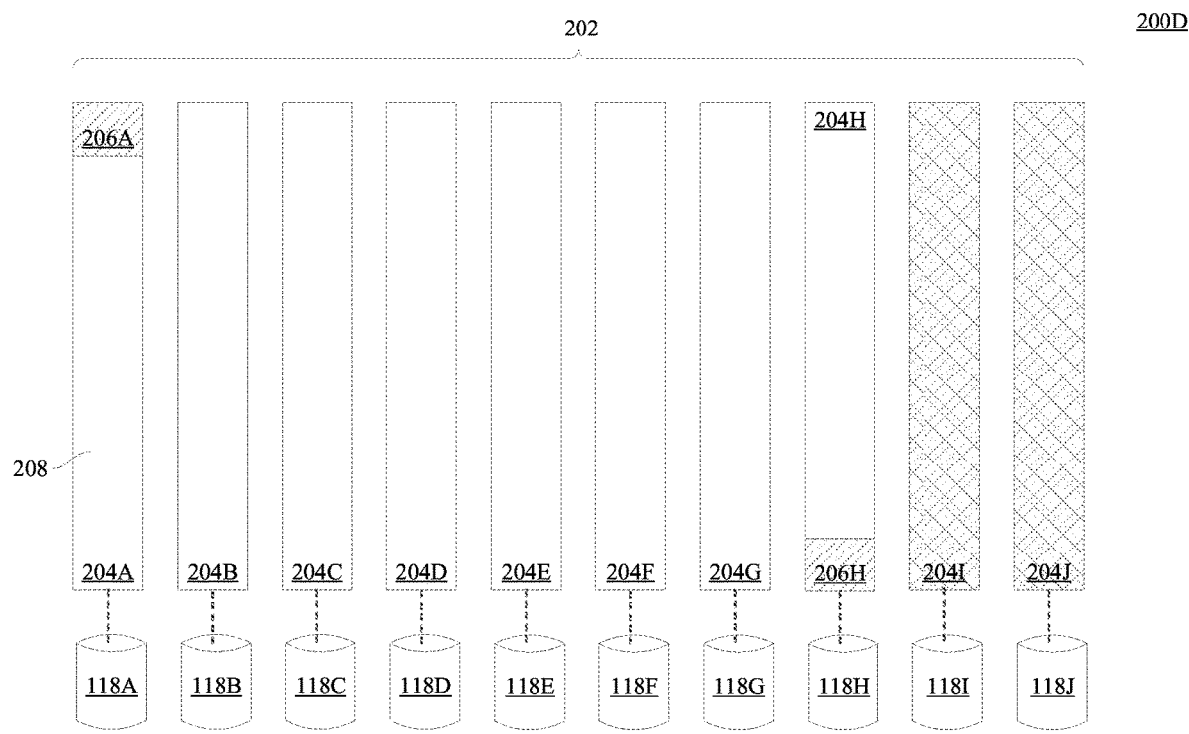
Figure 2E:
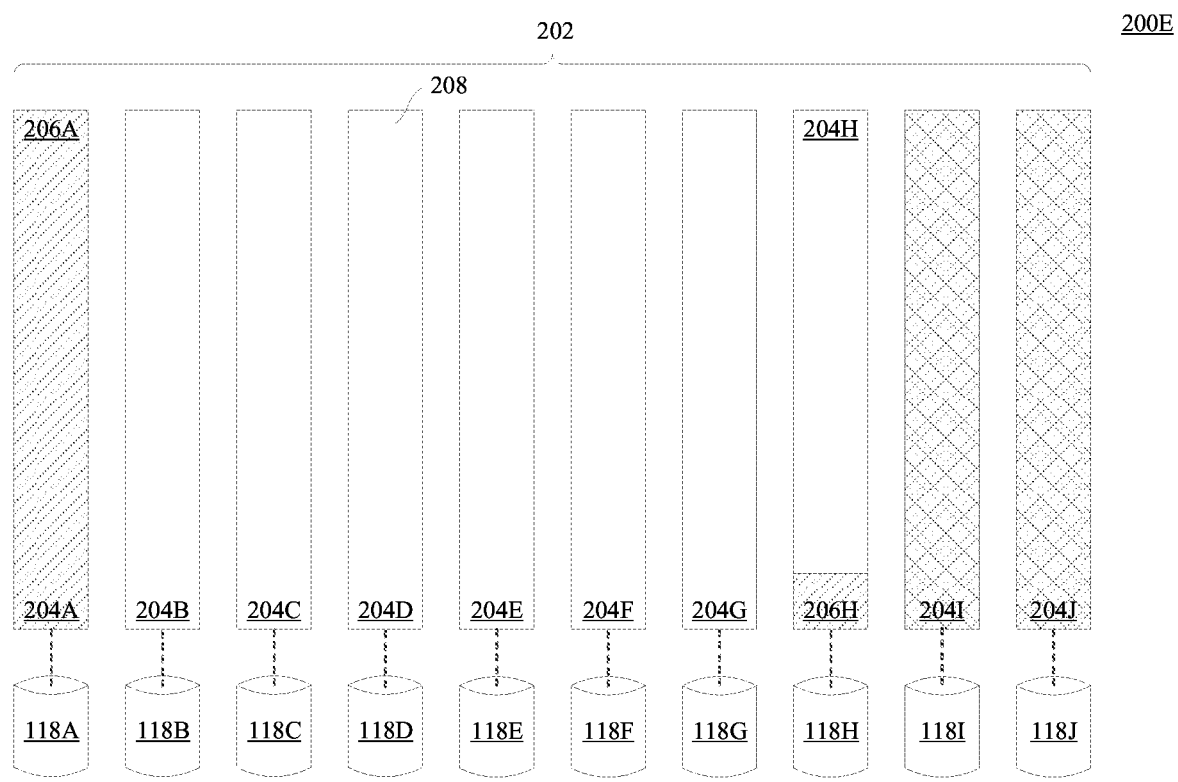

FIGS. 2D and 2E are block diagrams 200D and 200E of a stripe that stores data in a pseudo picket-fence pattern, according to an embodiment. In a pseudo picket-fence pattern, dirty data blocks 206 may be included in some, but not all segments 204. As illustrated in FIGS. 2D and 2E, stripe 202 stores dirty data in dirty data blocks 206A and 206H in segments 204A and 204H, but not in segments 204B-G. Further, in FIG. 2D, dirty data blocks 206A and 206H cover portions of segments 204A and 204H, while in FIG. 2E, dirty data block 206A covers entire segment 204A and dirty data block 206H covers a portion of segment 204H.

Going back to FIG. 1, when storage system 106 receives I/O requests from hosts 102, storage controllers 108 temporarily store data from the I/O requests in memory cache 116. At predefined or configurable time intervals, or on command, storage controller 108 flushes the data in memory cache 116 to one or more stripes 202.

To flush data from memory cache 116, storage controller 108 includes various algorithms. Because flushing data may be expensive and time consuming process that requires multiple I/O operations, storage controller 108 may select among various algorithms to efficiently flush data.

Figure 3:
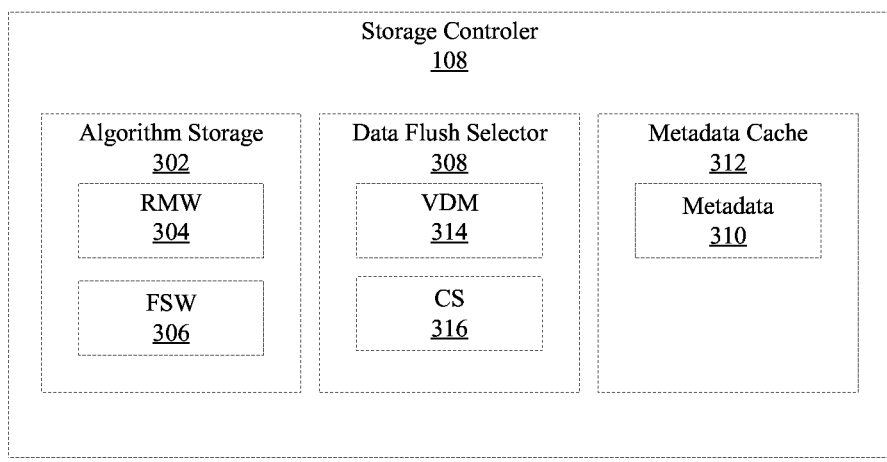
FIG. 3 is a block diagram of a storage controller, according to an embodiment.

FIG. 3 is a block diagram 300 of a storage controller 108, according to an embodiment. As illustrated in FIG. 3, storage controller 108 includes an algorithm storage 302. Algorithm storage 302 may be a memory storage within or accessible to storage controller 108, and may be included in a RAM, SSD, HDD, or another type of memory device. In an embodiment, algorithm storage 302 stores various algorithms that flush data from memory cache 116 to storage devices 118A-H. Depending on the location of dirty data blocks 206 in stripe 202, each algorithm may be more or less effective at flushing data. In an embodiment, algorithm storage 302 may store multiple algorithms, including a read-modify-write ("RMW") algorithm 304 and a full stripe write ("FSW") algorithm 306.

In an embodiment, RMW 304 traverses segments 204 in stripe 202 and identifies dirty data blocks 206. With respect to FIG. 2B this traversal may be from a first LBA of segment 204A to a last LBA of segment 204H. When RMW 304 encounters one of dirty data blocks 206, such as dirty data block 206A, RMW 304 reads dirty data block 206A from segment 204A and parity associated with dirty data block 206A from one or both segments 204I and 204J. Next, RMW 304 modifies data read from dirty data block 206A with the data from memory cache 116 and writes the modified data into dirty data block 206A. Further, RMW 304 calculates a new parity for the modified data using the modified data and the parity read from stripe 202. Once RMW 304 calculates the new parity, RMW 304 writes the new parity into segments 204I and/or 204J. In an embodiment, RMW 304 repeats the above read, modify, and write operations for each dirty data block 206B-206H in segments 204B-204H. Further, RMW 304 performs the read-write-modify operations on each dirty data block 206 serially in order to properly calculate parity for stripe 202.

In embodiments where the number of dirty data blocks 206 is small (i.e., below a preconfigured threshold) or where stripe 202 has many contiguous segments and dirty data blocks 206 that are sporadically spread throughout stripe 202, flushing data using RMW 304 does not require numerous I/O operations and is efficient and inexpensive. Such example embodiments are illustrated in FIGS. 2D and 2E. However, in embodiments where stripe 202 includes many dirty data blocks 206 that are spread throughout stripe 202 in a picket-fence pattern, flushing data with RMW 304 may result in a large number of I/O operations, and in turn, in an expensive and inefficient data flush. Such example embodiments are illustrated in FIGS. 2B and 2C.

Because the number of dirty data blocks 206 in stripe 202 varies, the number of I/O operations that storage controller 108 generates when flushing data with RMW 304 varies as with the number of dirty data blocks 206. As such, the cost of flushing data with RMW 304 varies and may not be easily calculated without substantial overhead.

Unlike RMW 304, FSW 306 reads data and parity from all segments 204 of stripe 202, even if some segments 204 do not include dirty data. FSW 306 then modifies the read data with data from memory cache 116, calculates a new parity for stripe 202 from the modified data, and writes the modified data into segments 204A-H and the new parity into segments 204H and/or 204J. Because FSW 306 replaces data in the entire stripe 202, the number of I/O operations remains approximately the same irrespective of the number of dirty data blocks 206 in stripe 202. Further, the cost of flushing data using FSW 306 typically remains constant and may be calculated without extensive overhead.

In an embodiment, storage controller 108 includes a data flush selector 308. Data flush selector 308 selects an algorithm, such as RMW 304 or FSW 306, that storage controller 108 may use to flush dirty data from stripe 202. In particular, data flush selector 308 selects RMW 304 or FSW 306 when stripe 202 includes dirty data blocks 206 in a picket-fence or pseudo picket-fence patterns.

In an embodiment, the cost associated with data flush selector 308 selecting an algorithm, may negate the advantages of using RMW 304 over FSW 306 or vice versa. As such, data flush selector 308 may implement techniques that are inexpensive and have low overhead, yet may accurately select an appropriate algorithm to flush data. If data flush selector 308 selects an incorrect algorithm, there may be various side effects to storage system 106. First, storage controller 108 may take a long time to flush data from memory cache 116 to stripe 202. Second, the data flush may also impact the I/O requests that storage system 106 receives from hosts 102. This is because data cannot be written into sections of memory cache 116 from which data is being flushed to storage devices 118. As such, while the data in memory cache 116 is being flushed, the I/O requests may be queued in a memory queue until the data flush completes and memory cache 116 may again store data. The longer the data flush takes place, the longer a section of memory cache 116 is inaccessible to I/O requests from hosts 102, and the longer system 106 processes the I/O requests.

To determine an optimal algorithm, data flush selector 308 may use metadata 310. Metadata 310 may be stored in metadata cache 312. Metadata cache 312 may be memory storage in or accessible to storage controller 108. In an embodiment, metadata cache 312 may be included in a RAM, SSD, HDD, or another type of memory device.

In an embodiment, metadata 310 includes metadata pertaining to an I/O transmitted from stripe 202 to memory cache 116. As discussed above, when storage controller 108 reads data from stripe 202 to store in memory cache 116, storage controller 108 marks the location of the read data in stripe 202 as dirty data. Because storage controller 108 reads data from stripe 202 using a particular LBA range, storage controller 108 may store the LBA range for the read data in metadata 310. Further, because I/O requests from stipe 202 to memory cache 116 generate dirty data blocks 206 in stripe 202, storage controller 108 may also store in metadata 310 a number of dirty data blocks 206 generated from the read data. Yet further, storage controller 108 may store a flag in metadata 310. The flag may indicate whether dirty data in stripe 202 is contiguous or non-contiguous. Contiguous data, for example, may be dirty data that includes an LBA range of one of segments 204, such as segment 204A in FIG. 2D. Non-contiguous dirty data may be dirty data that has LBA ranges scattered throughout stripe 202, such as dirty data in dirty data blocks 206A-H in FIGS. 2B and 2C. Metadata 310 may also include an average size of the I/O request. In an embodiment, storage controller 108 may determine the average size of the I/O request by dividing the number of dirty data blocks 206 created in stripe 202 by the number of inserts into stripe 202.

In an embodiment, data flush selector 308 evaluates metadata 310 and identifies instances where dirty data is non-contiguous and/or average I/O size is below a predefined or configurable I/O size threshold. When data flush selector 308 identifies instances where dirty data is non-contiguous and/or the average I/O size is below a predefined or configurable I/O size threshold, data flush selector 308 may perform additional checks to determine whether to use RMW 304 or FSW 306 to flush data.

To determine whether to use RMW 304 or FSW 306, data flush selector 308 may use a virtual disk management ("VDM") algorithm 314 and a cache selection ("CS") algorithm 316. In an embodiment, VDM algorithm 314 and CS 316 may be stored within data flush selector 308 or elsewhere in storage system 106.

To determine whether to flush data from memory cache 116 using RMW 304 or FSW 306, VDM algorithm 314 may calculate the cost of flushing memory cache 116 using FSW 306. As discussed above, the cost for flushing data using FSW 306 may be approximately fixed because storage controller 108 would read data and parity from the entire stripe 202, generate new data that includes data from memory cache 116, calculate a new parity for the entire stripe using the new data, and store the new data and the new parity back into stripe 202. Additionally, sequentially or in parallel, VDM algorithm 314 may also calculate the cost of flushing memory cache 116 using RMW 304 as described below.

In calculating the cost for using RMW 304, VDM algorithm 314 may also use metadata 310 stored in metadata cache 312. For example, VDM algorithm 314 may use metadata 310 to determine if the dirty data in dirty data blocks 206 is contiguous or non-contiguous. As discussed above, VDM algorithm 314 may determine whether dirty data is contiguous or non-contiguous using a flag stored in metadata 310.

If the dirty data is contiguous, VDM algorithm 314 may determine if a full segment write of data into dirty data block 206 has occurred. If a full segment write occurred, dirty data block 206 may span the memory space of one of segments 204. Next, if the full segment write occurred, VDM algorithm 314 may calculate the cost for using RMW 304 to flush memory cache 116 as the cost of the first RMW 304 pass through stripe 202 without parity hits plus the cost of the subsequent RMW 304 passes through stripe 202 with a parity cache hit. On the other hand, if the full segment write did not occur, VDM algorithm 314 may calculate the cost for using RMW 304 to flush memory cache 116 as though there would not be a parity cache hit on any of the RMW 304 passes.

In an embodiment, where metadata 310 indicates that the dirty data is non-contiguous, VDM algorithm 314 may assume that flushing data from memory cache 116 using RMW 304 would involve a worst case number of storage devices 118 and I/O operations. That is, VDM algorithm 314 may assume that all segments 204A-H of stripe 202 spread across storage devices 118A-H would include dirty data blocks 206A-H. In this case, VDM algorithm 314 may calculate the cost for using RMW 304 to flush memory cache 116 as the cost that includes updating the number of storage devices 118 spanning stripe 202 plus the cost of inserting data into dirty data blocks 206 in storage devices 118. In an embodiment, this calculation also takes into account that the corresponding parity for the inserted data may not get a cache hit.

Once VDM algorithm 314 calculates the cost for flushing memory cache 116 using FSW 306 and RMW 304, VDM algorithm 314 may select a cache flushing algorithm with the lowest cost.

Figure 4:
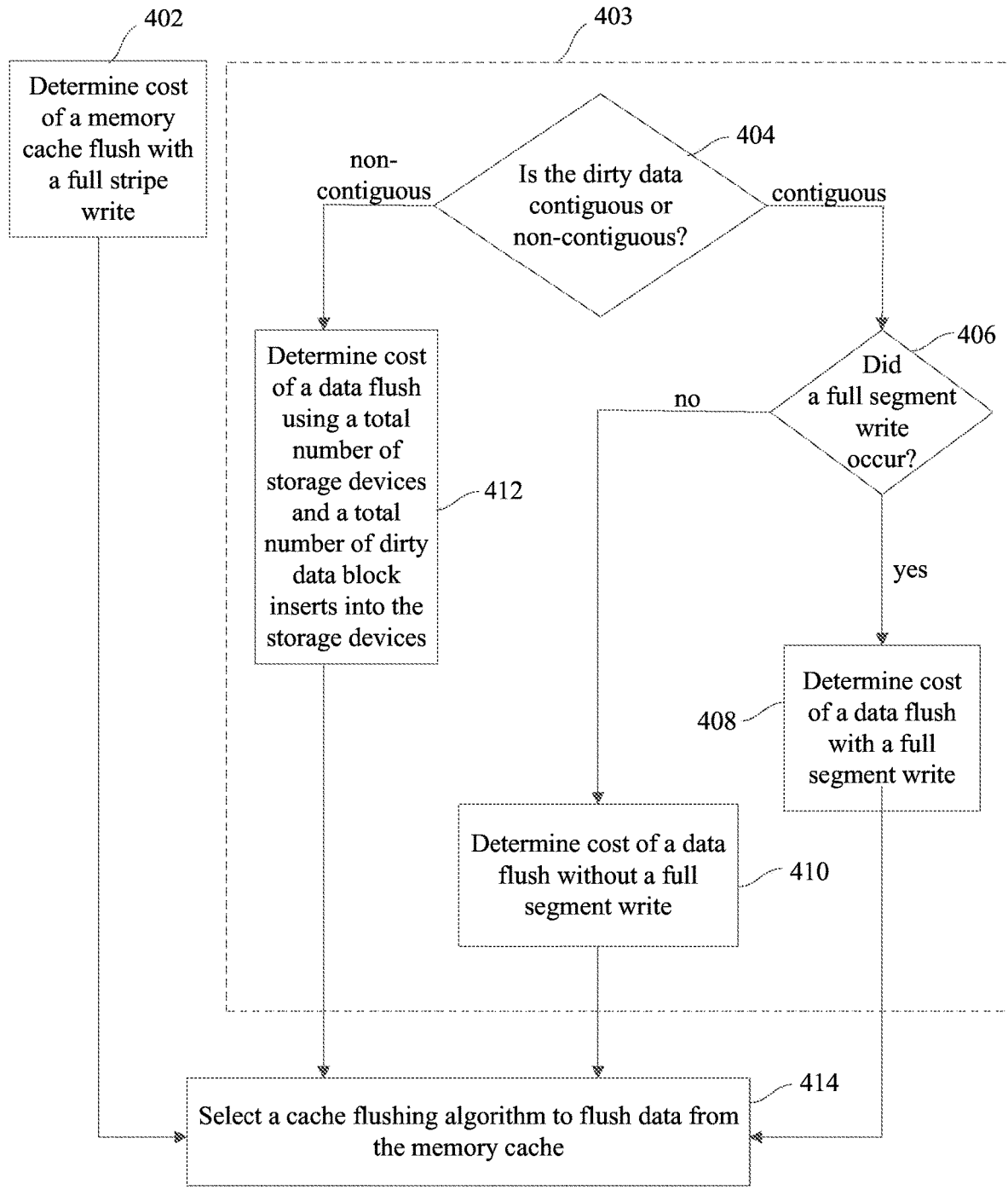
FIG. 4 is a flowchart of a method for selecting a cache flushing algorithm using virtual disk management algorithm, according to an embodiment.

FIG. 4 is a flowchart of a method 400 for determining a cache flushing algorithm using VDM algorithm 314, according to an embodiment. Method 400 may be implemented in hardware, software, or a combination thereof, of the components described in FIGS. 1-3.

At operation 402, cost of flushing data from memory cache using FSW 306 is determined. As discussed above, because FSW 306 replaces data in the entire stripe 202, the cost of flushing memory cache 116 using FSW 306 remains approximately the same for each memory cache flush.

At operation 403, cost of flushing data in memory cache using RMW 304 is determined. As illustrated in FIG. 4, operation 403 may include operations 404-412. In an embodiment, operations 404-412 may occur sequentially or in parallel with operation 402.

At operation 404, a determination whether dirty data is contiguous or non-contiguous is made. As discussed above, metadata 310 may store a flag that indicates whether dirty data in dirty data blocks 206 is contiguous or non-contiguous. If the dirty data is contiguous, the flowchart proceeds to operation 406. Otherwise to operation 412.

At operation 406, a determination is made whether a full segment write occurred. As discussed above, a full segment write occurs when dirty data block 206 spans one of segments 204. If the full segment right occurred, the flowchart proceeds to operation 408. Otherwise, the flowchart proceeds to operation 410.

At operation 408, cost of flushing data from memory cache with a full segment write is determined. For example, VDM algorithm 314 determines the cost of flushing data from memory cache 116 as the sum of the cost of the first RMW 304 pass with no parity hits and the cost of subsequent RMW 304 passes having a parity hit.

At operation 410, cost of flushing data from memory cache without a full segment write is determined. For example, VDM algorithm 314 determines the cost of flushing data as though there would be no parity cache hits on any of the RMW 304 passes.

At operation 412, cost of flushing data in memory cache with a non-contiguous dirty data is determined. For example, VDM algorithm 314 determines the cost using the total number of storage devices 118 spanning stripe 202 and the cost of a number of dirty cache inserts into segments 204 of corresponding storage devices 118. In an embodiment, VDM algorithm 314 may also take into account that the corresponding parity for data may not get a cache hit.

At operation 414, an algorithm for flushing data in the memory cache is selected. For example, VDM algorithm 314 selects the FSW 306 or RMW 304 based on the cost determined in operations 402 and one of 408, 410, and 412.

Going back to FIG. 3, data flush selector 308 also includes CS algorithm 316. In an embodiment, CS algorithm 316 traverses stripe 202 when metadata 310 indicates that data stored in memory cache 116 is non-contiguous and the average size of the I/O request is below a predefined I/O size threshold. If CS algorithm 316 determines that the size of the I/O is below the I/O size threshold, CS algorithm 316 counts a number of contiguous ranges in stripe 202 until the number of contiguous ranges crosses a configurable contiguous threshold. The contiguous ranges in stripe 202 are portions of segments 204 that store clean data 208. Once the number of contiguous ranges crosses the contiguous threshold, CS algorithm 316 indicates that a FSW 306 is less costly than RMW 304, and selects FSW 306. If the number of contiguous ranges does not cross the contiguous threshold, CS algorithm 316 selects RMW 304.

In an embodiment, when metadata 310 indicates that data stored in memory cache 116 is contiguous, storage controller 108 uses a current algorithm in its firmware to flush data from memory cache 118.

Figure 5:
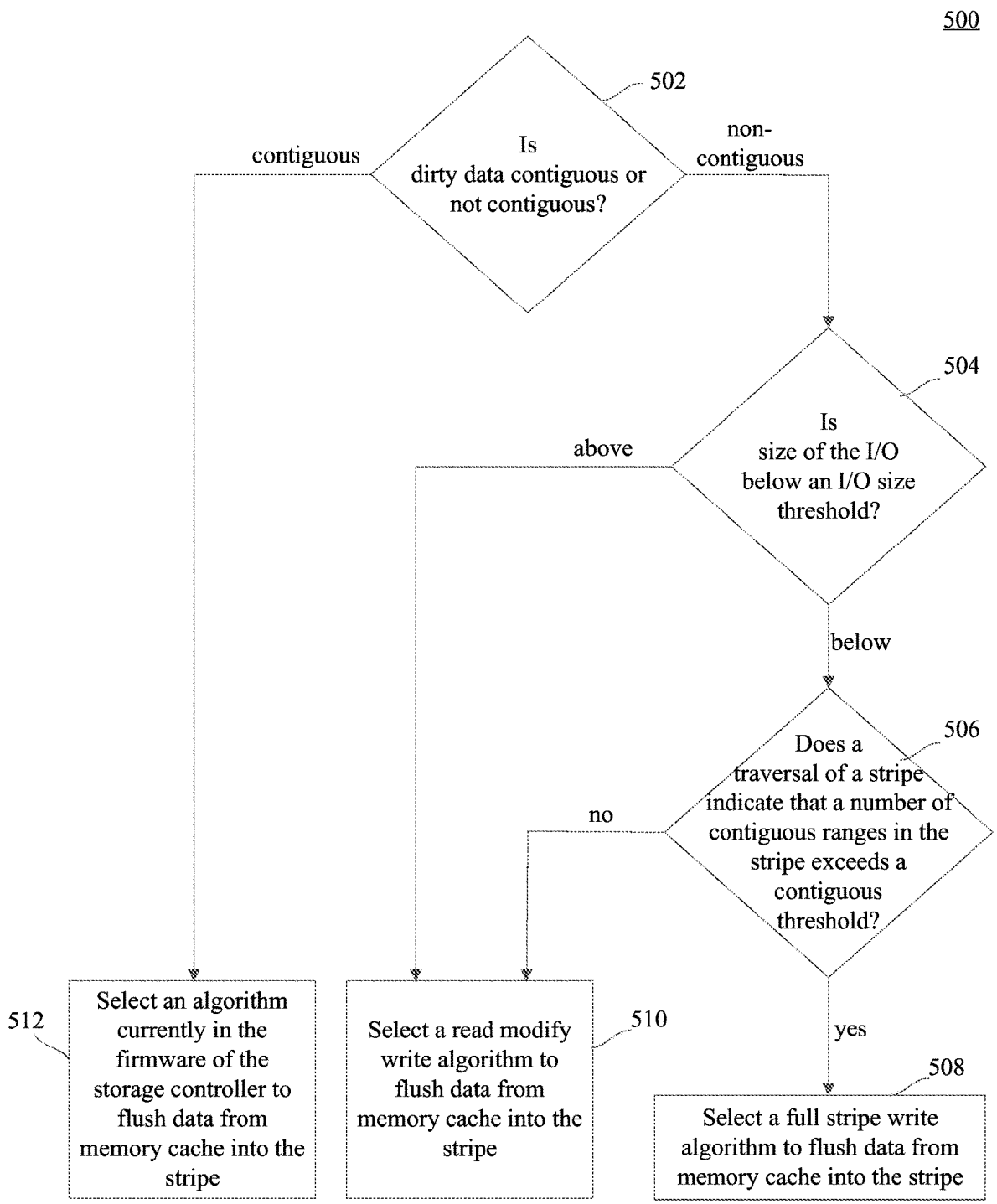
FIG. 5 is a flowchart of a method for selecting a cache flushing algorithm using a cache selection algorithm, according to an embodiment.

FIG. 5 is a flowchart of a method 500 for determining a cache flushing algorithm with CS algorithm 316, according to an embodiment. Method 500 may be implemented in hardware, software, or a combination thereof, of the components described in FIG. 1-3.

At operation 502, a determination whether dirty data is contiguous or non-contiguous is made. If dirty data is non-contiguous, the flowchart proceeds to operation 504. Otherwise the flowchart proceeds to operation 512. To determine whether dirty data is contiguous or non-contiguous, CS algorithm 316 uses metadata 310.

At operation 504, a determination whether average size of I/O is below a size threshold is made. If the average size of I/O is below the I/O size threshold, the flowchart proceeds to operation 506. Otherwise the flowchart proceeds to operation 508. To determine whether the average size of I/O is below the I/O size threshold, CS algorithm 316 uses LBA ranges for dirty data blocks that is stored in metadata 310.

At operation 506, a traversal of a stripe is made until a number of contiguous ranges in the stripe exceeds a contiguous threshold. For example, CS algorithm 316 may traverse stripe 202 and count a number of contiguous LBA ranges in segments 204 of stripe 202. The contiguous ranges in stripe 202 may be ranges that include clean data 208. In an embodiment, operation 506 may proceed until the number of contiguous LBA ranges exceeds the contiguous threshold, in which case the flowchart proceeds to operation 508. If the contiguous threshold is not reached, the flowchart proceeds to operation 510.

At operation 508, FSW 306 is selected. For example, CS algorithm 316 selects FSW 306 to flush data from memory cache 116 to stripe 202.

At operation 510, RMW 304 is selected. For example, CS algorithm 316 selects RMW 304 to flush data from memory cache 116 to stripe 202.

At operation 512, a current algorithm is selected. For example, CS algorithm 316 does not select RMW 304 or FSW 306 to flush data from memory cache 116. Instead, storage controller 108 flushed data from memory cache 116 using an algorithm that is currently loaded into its firmware. This algorithm can be RMW 304, FSW 306 or other algorithms used to flush data.

Figure 6:
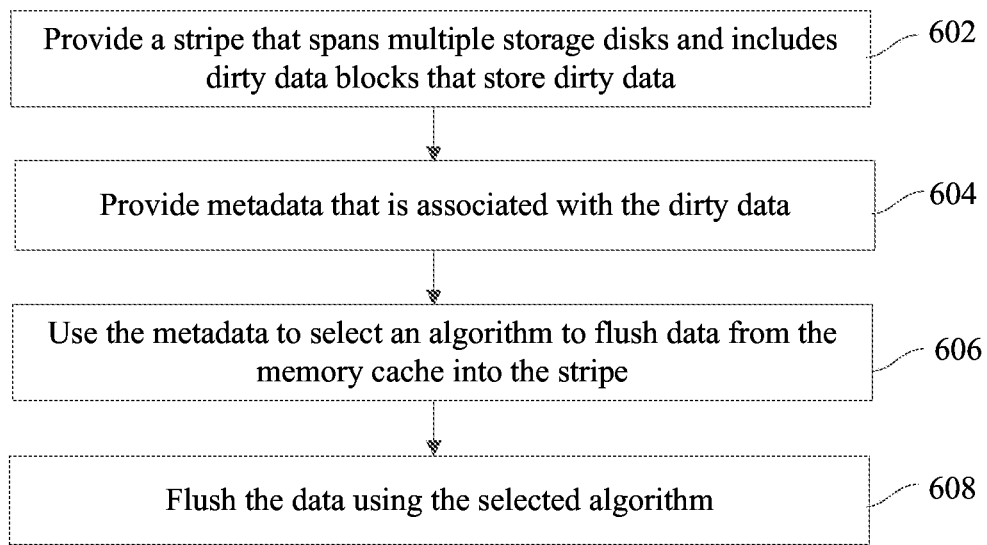
FIG. 6 is a flowchart of a method for using metadata to select a cache flushing algorithm, according to an embodiment.

FIG. 6 is a flowchart a method 600 for using metadata to select an algorithm to flush dirty data, according to an embodiment. Method 600 may be implemented in hardware, software, or a combination thereof, of the components described in FIG. 1-3.

At operation 602, a stripe that spans a plurality of storage devices is provided. For example, storage system 106 provides stripe 202 that spans storage devices 118. In a further example, stripe 202 includes multiple segments 204 that store dirty data in dirty data blocks 206. Example patterns of dirty data blocks 206 include a picket-fence pattern shown in FIGS. 2B and 2C and a pseudo picket-fence pattern shown in FIGS. 2D and 2E.

At operation 604, metadata is provided. For example, metadata 310 is provided in metadata cache 312. As discussed above, metadata 310 stores information associated with dirty data and dirty data blocks 304 in stripe 202.

At operation 606, an algorithm for flushing data from memory cache is selected. For example, data flush selector 308 selects an algorithm, such as FSW 304 or RMW 306 to flush data from memory cache 116 to stripe 202. As discussed above, data flush selector 308 may use metadata 310 and VDM algorithm 314 or CS algorithm 316 to select FSW 306 or RMW 304. In this way, when stripe 202 includes dirty data blocks 206 in a picket-fence or pseudo picket-fence patterns shown in FIGS. 2B-2E, data flush selector 308 may use VDM algorithm 314 or CS algorithm 316 to select an optimal algorithm to flush data.

At operation 608, data is flushed using a selected algorithm. For example storage controller 108 flushed data from memory cache 116 using an algorithm selected in operation 606.

What is claimed is:

1. A method comprising:
  storing metadata in a metadata cache, wherein the metadata identifies location of dirty data stored in a stripe that results from an input/output request, wherein the stripe spans a plurality of storage devices and includes a plurality of segments and the dirty data is included in at least one segment in the plurality of segments;
  storing data in a memory cache that is separate from the plurality of storage devices;
  selecting a cache flushing algorithm based on a cost of a read-write-modify algorithm, where the cost of the read-write-modify algorithm is determined using the metadata, and based on a cost of a full stripe write algorithm; and
  flushing the data from the memory cache to the stripe using the selected cache flushing algorithm.

2. The method of claim 1, wherein the metadata stores a flag identifying whether the dirty data within the at least one segment is contiguous or non-contiguous.

3. The method of claim 1, wherein the metadata stores an average size of I/O that creates dirty data within the at least one segment.

4. The method of claim 1,
  wherein the cost of the read-write-modify algorithm is the cost of the read-write-modify algorithm with a full segment write of the dirty data into the at least one segment and the metadata identifies that the dirty data is contiguous.

5. The method of claim 1, wherein the cost of the read-write-modify algorithm is the cost of the read-write-modify algorithm without a full segment write of the dirty data into the at least one segment and the metadata identifies that the dirty data is contiguous.

6. The method of claim 1, wherein the cost of the read-write-modify algorithm is the cost of the read-write-modify algorithm using a number of the plurality of storage devices where the metadata identifies that the dirty data is non-contiguous and a number of dirty data blocks that include the dirty data in the stripe.

7. The method of claim 1, wherein the selecting further comprises:
  selecting an algorithm loaded into firmware of a storage controller to flush the data from the memory cache when the dirty data is contiguous.

8. The method of claim 1, wherein the selecting further comprises:
  selecting the read-write-modify algorithm to flush the data from the memory cache when an average I/O size that created the dirty data is below an I/O size threshold and the metadata identifies that the dirty data is non-contiguous.

9. The method of claim 1, wherein the selecting further comprises:
  selecting the cache flushing algorithm based on a number of contiguous ranges of clean data within the stripe and an average I/O size that created the dirty data in the stripe being above an I/O size threshold.

10. The method of claim 1, wherein the dirty data in the stripe is in a picket-fence pattern.

11. A computing device comprising:
  a memory containing machine readable medium comprising machine executable code having stored thereon instructions for performing a method of selecting a cache flushing algorithm; and
  a processor coupled to the memory, the processor configured to execute the machine executable code to cause the processor to:
    store metadata in a metadata cache, wherein the metadata includes an indication that dirty data stored in a stripe is contiguous or non-contiguous, wherein the stripe spans a plurality of storage devices and includes a plurality of segments and the dirty data is included in at least one segment in the plurality of segments;
    store data in a memory cache that is separate from the plurality of storage devices;
    select the cache flushing algorithm based on a cost of a read-write-modify algorithm, wherein the cost of the read-write-modify algorithm is determined using the indicator in the metadata, and based on a cost of a full stripe write algorithm; and flush the data from the memory cache using the cache flushing algorithm.

12. The computing device of claim 11, wherein the dirty data that is non-contiguous is spread out throughout the plurality of segments in the stripe.

13. The computing device of claim 11, wherein the dirty data that is contiguous is stored entirely in the at least one segment in the plurality of segments.

14. The computing device of claim 11, wherein
the cost of the read-write-modify algorithm is the cost of the read-write-modify algorithm with a full segment write of the dirty data into the at least one segment when the indication indicates that the dirty data is contiguous.

15. The computing device of claim 11, wherein
the cost of the read-write-modify algorithm is the cost of the read-write-modify algorithm without a full segment write of the dirty data into the at least one segment when the indication indicates that the dirty data is contiguous.

16. The computing device of claim 11, wherein the processor is further configured to execute the machine executable code to cause the processor to select an algorithm loaded into storage controller to flush the data from the memory cache when the indication in the metadata indicates that the dirty data is contiguous.

17. The computing device of claim 11, wherein the processor is further configured to execute the machine executable code to cause the processor to further select the read-write-modify algorithm to flush the data from the memory cache when an average I/O size that created the dirty data is below an I/O size threshold.

18. A non-transitory machine readable medium having stored thereon instructions for performing a method comprising machine executable code which when executed by at least one machine, causes the machine to:

store metadata in a metadata cache, wherein the metadata identifies location of dirty data stored in a stripe that results from an input/output request, wherein the stripe spans a plurality of storage devices and comprises a plurality of segments and the dirty data is stored in a picket-fence pattern in at least one segment in the plurality of segments;

store data in a memory cache that is separate from the plurality of storage devices;

select a cache flushing algorithm based on a cost of a read-write-modify algorithm, wherein the cost of the read-write-modify algorithm is determined using the metadata, and based on a cost of a full stripe write algorithm; and flush the data from the memory cache to the stripe using the cache flushing algorithm.

19. The non-transitory machine readable medium of claim 18, wherein the metadata stores a logical block address range of the dirty data.

20. The non-transitory machine readable medium of claim 18, wherein the metadata stores a flag identifying whether the dirty data is contiguous or non-contiguous and the cost of the read-write-modify algorithm is determined by accessing the flag.

* * * * *